United States Patent
Tempas

(10) Patent No.: US 7,055,866 B2
(45) Date of Patent: Jun. 6, 2006

(54) NON-DAMMING COUPLER

(75) Inventor: Jeffrey F. Tempas, Oostburg, WI (US)

(73) Assignee: Kohler Co., Kohler, WI (US)

(*) Notice: Subject to any disclaimer, the term of this patent is extended or adjusted under 35 U.S.C. 154(b) by 25 days.

(21) Appl. No.: 10/821,779

(22) Filed: Apr. 9, 2004

(65) Prior Publication Data

US 2004/0245771 A1   Dec. 9, 2004

Related U.S. Application Data

(60) Provisional application No. 60/462,098, filed on Apr. 10, 2003.

(51) Int. Cl.
*F16L 55/00* (2006.01)
(52) U.S. Cl. ............... 285/148.23; 285/148.22; 285/148.26; 285/148.27
(58) Field of Classification Search ........... 285/148.22, 285/148.23, 148.26, 148.27, 324; 4/288, 4/417
See application file for complete search history.

(56) References Cited

U.S. PATENT DOCUMENTS

| 290,045 | A | * | 12/1883 | Hardy | 285/148.23 |
|---|---|---|---|---|---|
| 1,722,676 | A | * | 7/1929 | Parker | 285/148.23 |
| 2,974,684 | A | * | 3/1961 | Ginaven et al. | 285/148.23 |
| 3,602,531 | A | * | 8/1971 | Patry | 285/148.23 |
| 3,680,896 | A | * | 8/1972 | Cupit | 285/148.23 |
| 3,727,953 | A | * | 4/1973 | Martin et al. | 285/148.23 |
| 4,173,361 | A | * | 11/1979 | Gagas | 285/64 |
| 4,655,923 | A | * | 4/1987 | Leone | 210/512.2 |
| 5,176,406 | A | | 1/1993 | Straghan | |
| 5,462,311 | A | | 10/1995 | Cipolla | |
| 5,701,388 | A | | 12/1997 | Steinhardt et al. | |
| 5,826,918 | A | | 10/1998 | Bowles et al. | |
| 5,930,852 | A | | 8/1999 | Gravatt et al. | |
| 6,086,116 | A | * | 7/2000 | Smahl | 285/179 |
| 6,199,913 | B1 | | 3/2001 | Wang | |
| 6,279,177 | B1 | | 8/2001 | Gloodt | |
| 6,357,060 | B1 | | 3/2002 | Gloodt | |
| 6,790,480 | B1 | * | 9/2004 | Oki et al. | 427/402 |

FOREIGN PATENT DOCUMENTS

JP   5-288295   * 11/1993

* cited by examiner

*Primary Examiner*—James M. Hewitt
(74) *Attorney, Agent, or Firm*—Quarles & Brady LLP

(57) ABSTRACT

An open-ended coupler for joining a pipe to a larger opening defines a passageway having straight and angled sections. The straight section has a uniform inner diameter concentric about a centerline sized to receive the outer diameter of the pipe. The angled section has a narrow end with an inner diameter less than that of a wide end and of the straight section, and being at least as large as the inner diameter of the pipe. The angled section has an upper portion above the centerline that at least in part increases in radius from the narrow end to the wide end. A lower portion has a constant radius, at least along a line extending between the narrow and wide ends at a six o'clock position with respect to the open end of the angled section. A face groove holds an o-ring and an alignment tab fixes the rotational orientation of the coupler.

7 Claims, 3 Drawing Sheets

Us 7,055,866 B2

NON-DAMMING COUPLER

CROSS-REFERENCE TO RELATED APPLICATIONS

This application claims benefit to U.S. Provisional Patent Application No. 60/462,098 filed Apr. 10, 2003.

STATEMENT OF FEDERALLY SPONSORED RESEARCH OR DEVELOPMENT

Not applicable.

BACKGROUND OF THE INVENTION

1. Technical Field

The present invention relates to unions for coupling a water line to the inlet of a pump, such as that used in hydrotherapeutic spas.

2. Description of the Related Art

Hydrotherapeutic spas or baths include water jets for imparting turbulence in the water. The jets are downstream from one or more water pumps. Each pump is fed water through an inlet flange to which is connected a supply pipe, typically made of polyvinyl chloride material. Conventional supply pipes are of a diameter slightly smaller than the opening to the input flange. Thus, a special union or coupler is used to mate the pipe to the input flange. This coupler can be formed as a part of the flange or can be a separate piece connected in some manner to the flange.

For example, the input flange may have a tubular extension defining the inlet opening. A separate tubular coupler can be mated with the tubular extension by a collar threaded onto the extension and capturing a peripheral flange on the coupler. The wall thickness of the coupler reduces its inner diameter so that it is sized just large enough to accept the outer diameter of the supply pipe, thereby providing the union of the supply pipe to the input flange. One or more o-rings can be used to seal the connection when the collar is tightened. U.S. Pat. No. 5,701,388, hereby incorporated by reference as though fully set forth herein, discloses a similar arrangement and a pump unit of the type for which the present invention is designed to be used.

The problem with the existing constructions is that the wall thickness of the coupler and/or the supply pipe extends radially inward (of lesser diameter) than the opening in the input flange. The coupler and possibly the supply pipe can thus become an obstruction to the return flow of water from the input flange causing damming or pooling of water during periods when the pump is not being operated. The amount of residual water retained in the pump or its supply lines is regulated to reduce the occurrence of bacteria developing in stagnate water. One way of reducing the amount of residual water retention is to raise the pump slightly and tilt it back several degrees from horizontal so that more of the water will drain back through the supply line by gravity. However, doing this can make stabilizing the pump difficult as well as create some downstream water drainage problems in the suction line because of the now decreased overall pitch from the water jets to the pump.

Accordingly, an improved connection at the inlet flange of the pump is desired.

SUMMARY OF THE INVENTION

The present invention provides an open-ended coupler, for joining a pipe to a larger opening, has a passageway defined by straight and angled sections. The straight section has a uniform inner diameter concentric about a centerline sized to receive the outer diameter of the pipe. The angled section has a narrow end with an inner diameter no greater than the inner diameter of the pipe and less than that of a wide end and of the straight section. The angled section has an upper portion above the centerline that at least in part increases in radius from the narrow end to the wide end. A lower portion has a constant radius, at least along a line extending between the narrow and wide ends at a six o'clock position with respect to the open end of the angled section.

In one preferred form the angled section narrow end has a smaller inner diameter than that of the pipe.

In another preferred form the angled section wide end defines a circular face groove holding an o-ring.

In still another preferred form the angled section wide end includes an alignment feature for fixing the rotational position of the coupler about the centerline. The alignment feature is preferably at the upper portion of the angled section and includes a tab projecting from the angled section essentially parallel to the centerline with an axial slot sized to receive a pin fixed with respect to the opening.

The present invention thus provides an improved coupler specially designed to connect a standard diameter water supply pipe to the inlet of a pump housing without obstructing back flow of water and causing pooling when the pump is not being operated. The integral alignment feature ensures that the coupler is oriented properly so that damming does not occur. The face groove accepts standard o-rings for sealing the connection. Additionally, the internal passageway transitions smoothly to the wider end so as not to adversely impact the pressure and flow characteristics of the water passing through the connection.

These and still other advantages of the invention will be apparent from the detailed description and drawings. What follows is a description of a preferred embodiment of the present invention. To assess the full scope of the invention the claims should be looked to as the preferred embodiment is not intended as the only embodiment within the scope of the invention.

DETAILED DESCRIPTION OF THE PREFERRED EMBODIMENT

Figure 1:
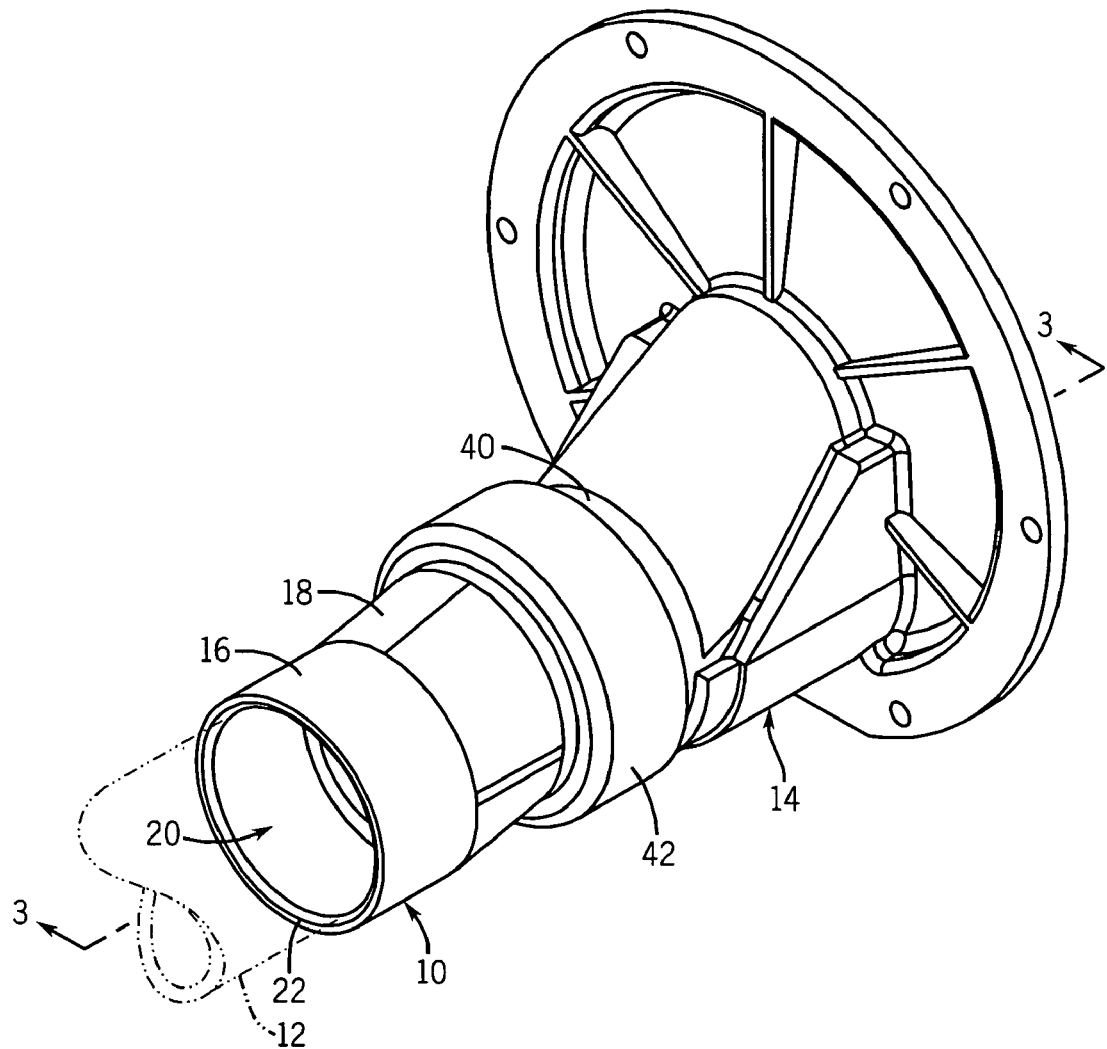
FIG. 1 is perspective view of a pump inlet assembly including a non-damming coupler according to the present invention.
Figure 2:
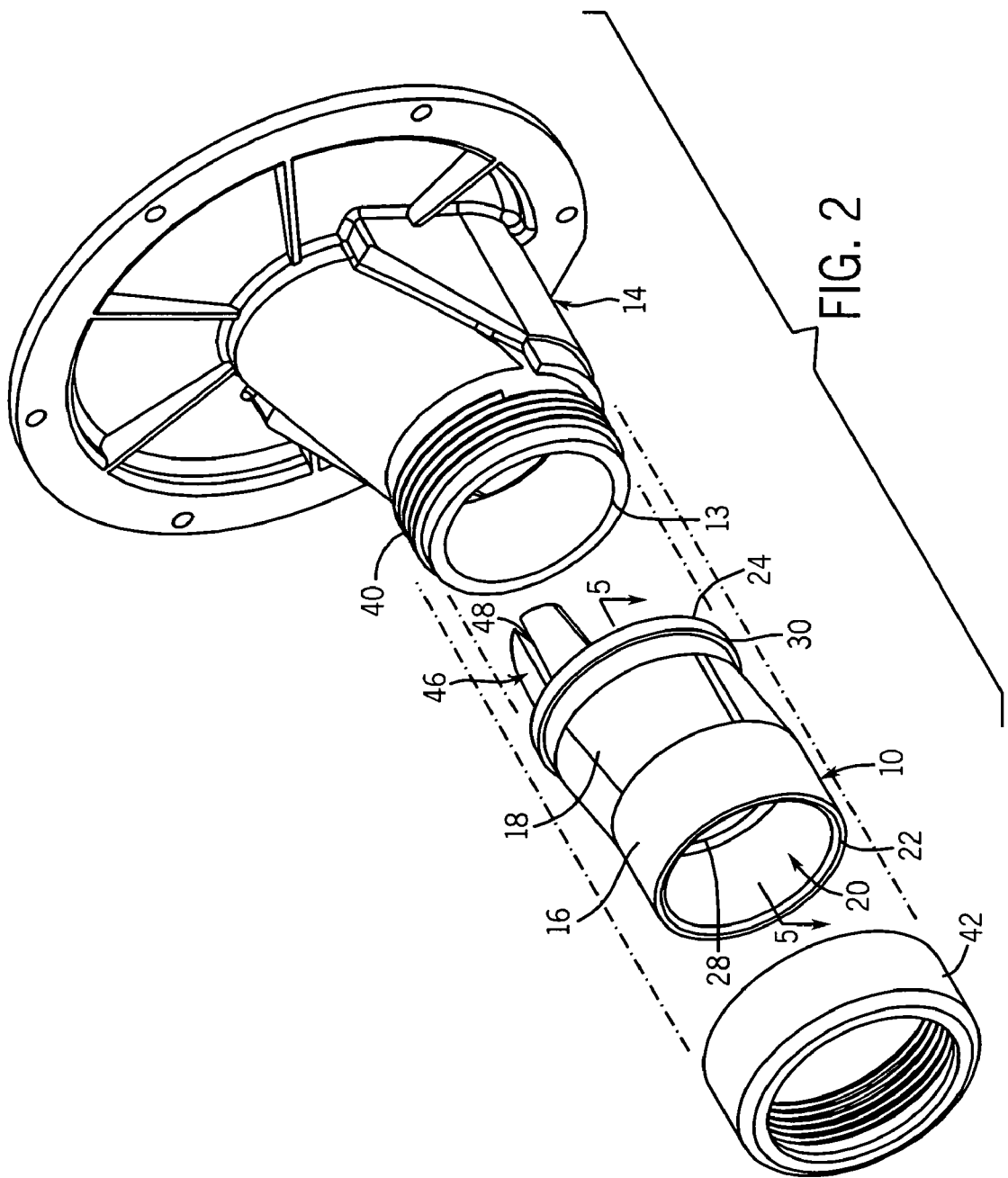
FIG. 2 is an exploded perspective view thereof.
Figure 3:
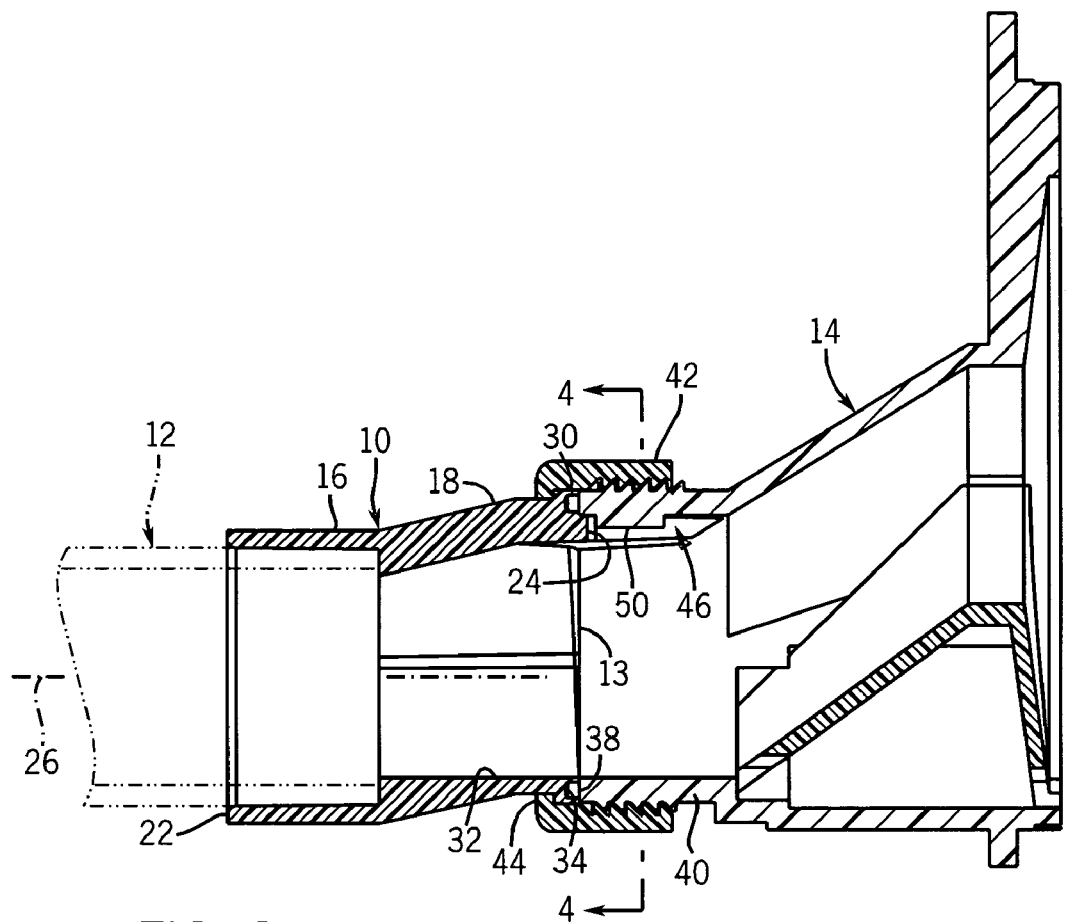
FIG. 3 is a cross-sectional view taken along line 3—3 of FIG. 1.

Referring to FIGS. 1–3, the present invention provides a specially designed coupler 10, which in one application, can be used to connect a water supply pipe 12 (shown in phantom) to the opening 13 of an input flange 14 of a water pump (not shown) used to circulate water in a hydrotherapeutic spa. The diameter of the opening 13 and the outer diameter of the supply pipe 12 are standard sizes with the opening 13 being larger such that the supply pipe 12 cannot mate directly with the input flange 14 without leaking.

Figure 5:
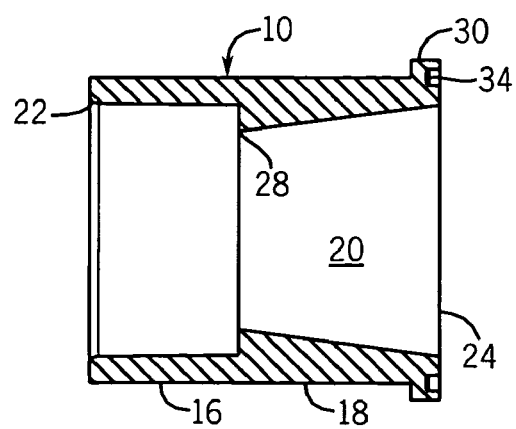
FIG. 5 is a cross-sectional view taken along line 5—5 of FIG. 2.

Referring to FIGS. 2, 3 and 5, the coupler 10 is a generally tubular piece having a straight section 16 and an angled section 18 defining a passageway 20 opening at opposite ends 22 and 24 of the coupler 10. The inner diameter of end 22 is rounded to ease insertion of the supply pipe 12 therein. The straight section 16 is cylindrical having an inner diameter and an outer diameter, both of uniform radius and concentric about a centerline 26. The straight section 16 transitions the angled section 18 at an intermediate internal narrow end 28 of the angled section 18 at which point the coupler 10 defines a radially inward step so that the passageway 20 is at its narrowest. From there, the coupler 10 angles in an upward direction so that the wide end 24 is axially offset from end 22. The interior surface of the angled section 18 varies with respect to its exterior surface as it moves from its narrow end 28 to the wide end 24.

Figure 4:
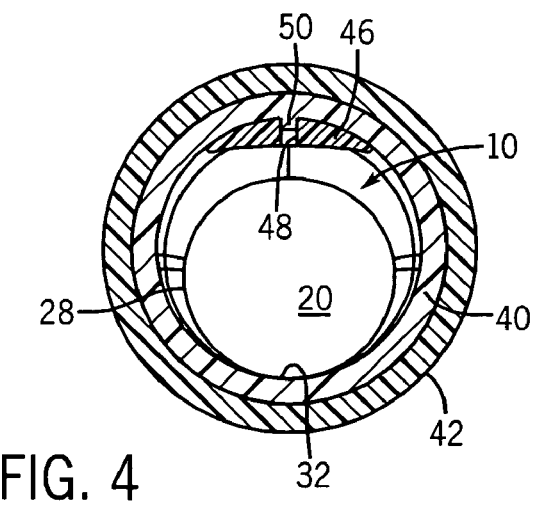
FIG. 4 is a cross-sectional view taken along line 4—4 of FIG. 3.

With reference to FIGS. 3–5, in particular, the exterior surface initially angles and then straightens up to an outwardly stepped peripheral flange 30. Although angled, the exterior surface has a generally circular cross-section. The interior surface, on the other hand, smoothly tapers radially outward from the narrow end 28 to the wide end 24. More specifically, an upper portion of the interior surface, that is above centerline 26 in FIG. 3, expands outward such that the radius from the centerline varies (increases) from the narrow end 28 to the wide end 24. In fact, the entire interior surface expands in this manner except for along a straight portion 32 at the very bottom or 6 o'clock position below centerline 26 where the radius from the centerline is uniform from the narrow end 28 to the wide end 24. This flat or straight portion 32 smoothly contours into the curved interior surface (see FIG. 4) so that the entire interior surface transitions smoothly from narrow to wide so as not to induce changes in the pressure or flow of the water passing through the coupler 10.

Referring to FIG. 3, the above configuration is designed to eliminate obstructions or damming surfaces that prevent the free flow of water returning from the pump back into the supply pipe 12. As shown, the straight bottom 32 of the angled section 18 is essentially aligned with the bottom of the opening 13 in the pump flange 14 and in addition is preferably radially inside of the inner diameter of the supply pipe 12, although it could be flush. The upper portion of the coupler 10 above the centerline 26 is not important in this regard since water will run down to the bottom by gravity.

The wide end 24 of the coupler 10 defines a face groove 34 holding an o-ring 38 for sealing against a tubular extension 40 of the input flange 14. The tubular extension 40 is threaded externally so that an internally threaded collar 42 can secure the coupler 10 (and thereby the supply pipe 12) to the input flange 14. The collar 42 has a lip 44 that clamps against the peripheral flange 30 of the coupler 10. Turning the collar 42 tightens the coupler 10 to the input flange 14 and compresses the o-ring 38 to create a tight seal. Preferably, the coupler 10 and the supply pipe 12 are made of polyvinyl chloride such that the conventional bonding cement can be used to secure these two pieces together.

The proper orientation of the coupler 10 with respect to the input flange 14 is essential to prevent damming. Thus, a special alignment feature 46 is provided at the upper portion of the coupler 10. The alignment feature 46 is essentially a tab or projection extending from the wide end 24 parallel to the centerline 26. The tab has an axial slot 48 opening at its distal end which is sized to fit around a nib 50 on the tubular extension 40 of the input flange 14 extending radially inward toward the center of the opening 13. The nib 50 and the tab are at the 12 o'clock position such that the coupler 10 is connected in the proper orientation with the angled section 18 angling up from the straight section 16 when the nib 50 is within the slot 48.

The present invention thus provides an improved coupler specially designed to connect a standard diameter water supply pipe to the inlet of a pump housing without obstructing back flow of water and causing pooling when the pump is not being operated. The integral alignment feature ensures that the coupler is oriented properly so that damming does not occur. The face groove accepts standard o-rings for sealing the connection. Additionally, the internal passageway transitions smoothly to the wider end so as not to adversely impact the pressure and flow characteristics of the water passing through the connection.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

INDUSTRIAL APPLICABILITY

The invention is a union or coupler for joining a water pipe to a larger diameter opening without causing pooling or damming of water at the connection.

What is claimed is:

1. A coupler for joining a pipe having an inner diameter and an outer diameter to an opening larger than the inner diameter of the pipe, the coupler being open ended and defining a passageway therebetween having a straight section and an angled section, the straight section having a uniform inner diameter concentric about a centerline and sized to receive the outer diameter of the pipe, the angled section having a wide end and a narrow end with an inner diameter less than that of the wide end and the straight section, wherein the angled section has an upper portion above the centerline that at least in part increases in radius from the narrow end to the wide end and a lower portion to a side of the centerline opposite the upper portion having a constant radius at least along a line extending between the narrow and wide ends at a six o'clock position with respect to the open end of the angled section, wherein the angled section wide end includes an alignment feature for fixing the rotational position of the coupler about the centerline, the alignment feature including a tab projecting from the angled section essentially parallel to the centerline and having an axial slot sized to receive a nib fixed with respect to the opening.

2. The coupler of claim 1, wherein the angled section narrow end is of a lesser inner diameter than the inner diameter of the pipe.

3. The coupler of claim 1, wherein the alignment feature is at the upper portion of the angled section.

4. The coupler of claim 1, wherein the angled section wide end defines a circular face groove.

5. A coupler for joining a pipe having an inner diameter and an outer diameter to an opening larger than the inner diameter of the pipe, the coupler being open ended and defining a passageway therebetween having a straight section and an angled section, the straight section having a uniform inner diameter concentric about a centerline and sized to receive the outer diameter of the pipe, the angled section having a wide end and a narrow end with an inner diameter less than that of the wide end and the straight section, wherein the angled section has an upper portion above the centerline that at least in part increases in radius from the narrow end to the wide end and a lower portion to a side of the centerline opposite the upper portion having a constant radius at least along a line extending between the narrow and wide ends at a six o'clock position with respect to the open end of the angled section, wherein the angled section wide end defines a circular face groove having an o-ring disposed in the face groove.

6. The coupler of claim 5, wherein the opening is in an input flange of a pump.

7. The coupler of claim 6, wherein the input flange includes an external thread section receiving a threaded collar engaging a peripheral flange at the wide end of the angled section.

* * * * *